United States Patent Office 3,689,419
Patented Sept. 5, 1972

3,689,419
TOILET BAR
Mao H. Yueh, Minneapolis, Minn., assignor to General Mills, Inc.
No Drawing. Filed Aug. 12, 1970, Ser. No. 63,289
Int. Cl. C11d 17/00
U.S. Cl. 252—90                                    7 Claims

ABSTRACT OF THE DISCLOSURE

A soap or toilet bar and a method of preparing and using such a soap bar is disclosed. The soap bar includes a nucleoprotein material.

---

This invention relates to an improved soap bar suitable for toilet use and to a method for preparation and use of same.

Soap bars or in other words toilet bars are usually prepared from tallow which has been saponified such as with sodium hydroxide. Soap bars may further include other saponified fats or oils such as the derivatives of coconut oil, castor oil, olive oil, peanut oil, palm kernel oil, coconut oil and the like. Soap bars may include detergents such as anionic detergents. Soap bars also commonly include auxiliary ingredients such as perfumes and coloring material. The present invention relates to such soap bars which further include nucleoprotein material.

The nucleoprotein material used in the present invention may be obtained from any substance having a substantial amount of nucleoprotein present, preferably fish milt, avian blood, or microbial material. Other sources would include wheat germ and various organ tissue such as thymus, spleen, pancreas and liver obtained from calves or testes obtained from bulls. For purposes of economics and ease in preparation, the substance should have at least 0.5% nucleoprotein, by weight. As used herein, the term "nucleoprotein material" will mean a material containing at least 0.5% nucleoprotein.

Fish milt is the most highly preferred source of the nucleoprotein. Fish milt is one of the waste products of the fish processing industry. It is made up primarily of the fish sperm surrounded by connective tissue. Analysis of the milt shows that it contains large amounts—i.e. 90% or more—of deoxyribonucleoprotein wherein the protein is protamine. Normally the milt is combined with other fish wastes and utilized to some extent as a hatchery feed. Some biochemical companies use the milt as a raw material for the preparation of DNA (deoxyribonucleic acid). More often than not, the milt is simply disposed of with the rest of the fish waste products.

The nucleoprotein material may be treated in various ways for purposes of stabilization, purification and concentration. The material may be heated and/or treated with a lower aliphatic alcohol to deactivate enzymes. It has been found that fresh milt can be preserved by adding small quantities of the sodium salt of ethylene diamine tetracetic acid, sodium arsenate and/or 5-nitrofurfural-semicarbazone. The use of small quantities of each of these materials is preferred. The material may be treated to remove cell walls and tissue. The material may be ground or blended to obtain uniform size and homogeneity such as in a blender or mixer. The material may be concentrated or dehydrated by conventional techniques such as vacuum, drum, tray, freeze drying and the like.

The milt can be heated to effect at least partial enzyme deactivation. Where the heating temperatures are high— i.e. 90° C. or above—the treatment times should be short. For example, if the heating temperature is between 106 and 116° C., the time may be about 2 to 4 seconds. Where the heating temperatures are below about 90° C.—i.e. about 50 to 90° C.—the treatment can be carried out for from a few minutes to an hour or more—i.e. about 5 minutes to two hours. It has been found that the above heat treatments are effective in extending the useful life of the milt solids and of the resulting soap bar products. However, care must be exercised to prevent the denaturization of the milt solids—i.e. the deoxyribonucleoproteins.

It is especially preferred to treat the milt solids with a lower aliphatic alcohol of 1 to about 5 carbon atoms for purposes of deactivating the enzymes and drying the material. Especially preferred alcohols are methanol, ethanol and isopropanol. The milt solids can be dispersed in the alcohol and then recovered. It is preferred to use from about 2 to about 30 volumes of the alcohol based on the volume of the milt solids. From an economic standpoint, the use of about 2 to about 10 volumes is especially preferred. The alcohol can be cold or heated to as high as its boiling point in the case of methanol, ethanol and isopropanol, or to about 90° C. in the case of the alcohols having boiling points above such temperature.

If desired, the milt can be dehydrated by conventional techniques—i.e. vacuum, drum, tray, freeze drying and the like. Where the enzymes have been at least partially inactivated, as above described, the dry milt solids can be stored for various periods of time prior to use in the present invention.

The soap bar is prepared by dispersing or mixing the milt solids with the soap bar base. The term "soap bar base" as used herein means the cleansing composition from which toilet bars are produced and may be soaps and/or detergent flakes. The flakes may be finely ground in order to assure uniform distribution of the nucleoprotein material throughout the soap bar. The mixture may then be formed into a bar such as by placing the flakes in a mold and pressing the flakes to form a solid bar. In some instances it may be desirable to add a small amount of water in order to more easily fuse the flakes into the solid bar. Representative soaps that may be used are sodium stearate, sodium palmitate and sodium oleate. Representative synthetic anionic detergents that may be included are dioctyl sodium sulfosuccinate and various sulfates and sulfonates, including sodium octyl sulfate, sodium nonyl sulfate, sodium decyl sulfate, sodium undecyl sulfate, sodium dodecyl sulfate, sodium tridecyl sulfate, sodium tetradecyl sulfate, sodium pentadecyl sulfate, sodium hexadecyl sulfate, sodium heptadecyl sulfate, sodium octadecyl sulfate, sodium oleyl sulfate, sodium octyl sulfonate, sodium nonyl sulfonate, sodium decyl sulfonate, sodium undecyl sulfonate, sodium dodecyl sulfonate, sodium tridecyl sulfonate, sodium hexadecyl sulfonate, sodium octadecyl sulfonate, sodium octyl benzene sulfonate, sodium nonyl benzene sulfonate, sodium decyl benzene sulfonate, sodium dodecyl benzene sulfonate, sodium hexadecyl benzene sulfonate, sodium tri (isopropyl) benzene sulfonate, sodium tri (isobutyl) naphthalene sulfonate and the like.

It has been found that even very small amounts of nucleoprotein material may be sufficient to produce toilet bars having excellent properties such as increased lathering and cleansing ability. The nucleoprotein material may typically be present in an amount of from 0.1% to 5.0% by weight based on the total weight of the soap bar. The preferred level is about 0.25% by weight.

In the method of using the toilet bar of the present invention, one usually mixes a portion of the bar with water such as on a wash cloth and applies the water solution or mixture, for example, to one's hands or face. The broader aspects of the present invention would include such washing with the present composition, namely, the mixture of water, nucleoprotein material, soap and/or anionic detergent, regardless of whether or not the material was first formed into toilet bar, i.e. the material may merely be a water solution of nucleoprotein material and soap and/or detergent which is applied to the body for washing or cleansing purposes.

The nucleoprotein material used in the present invention may be obtained from avian blood erythrocytes which have been processed in various ways to increase the concentration of deoxyribonucleoprotein and correspondingly reduce color. This procedure is carried out by hemolyzing the erythrocytes thus releasing the hemoglobin. Various hemolyzing agents can be employed to rupture the cell walls of the erythrocytes. A preferred such agent is saponin which can be employed in low concentrations—i.e. from about 0.01 to 1.9% by weight based on the dry weight of the erythrocytes. After the hemolysis is completed, the solids can be washed, preferably with water or dilute aqueous NaCl solutions to remove the soluble materials and especially the hemoglobin. The erythrocytes per se or any fraction thereof can also be treated with a lower aliphatic alcohol of from 1 to about 5 carbon atoms. Such treatment tends to deactivate enzymes and other microorganisms, thus preventing deterioration. Additionally, the blood from which the erythrocytes are obtained can be treated with heparin and/or sodium citrate to prevent clotting and thus facilitate the separation of the erythrocytes from the plasma. If desired, the erythrocytes, or fractions thereof, can be treated as described with respect to the milt and can be dehydrated by conventional techniques—i.e. vacuum, drum, tray, freeze drying and the like.

The soap bars are then prepared by dispersing the described fraction of erythrocytes in the soap bar base in the same manner and amounts as described with respect to the fish milt.

The nucleoprotein material of the present invention may typically be a microorganism such as *Xanthomonas campestris* NRRL–B1459, *Xanthomonas campestris* var. *alfalfae*, *Agrobacterium tumefacieus* NRRL–836, *Escherichia coli* ATCC 11775, *Aerobacter aerogenes*, *Alcaligenes faecalis* ATCC 337, *Bacillus subtilis* var. *natto*, *Erwinia cartovoria*, *Bacillus cereus*, *Escherichia coli* strep, resistant, *Klebsiella* sp., *Micrococcus citreus*, *Proteus vulgaris*, *Pseudomonas aeroginosa*, *Sarcina lutia*, *Serratia marcesceus*, *Streptococcus liquefacieus* and the like. The microorganisms are preferably separated from their growing medium such as by centrifugation. If desired, the microorganism cells may be washed, for example using a lower aliphatic alcohol such as methanol, ethanol or isopropanol. The microorganisms, if desired, may be dried using conventional drying techniques such as vacuum, drum, tray, freeze drying and the like.

The soap bars are prepared by dispersing the microbial material in the soap bar base in the same manner and amounts as described with respect to the fish milt nucleoprotein, for example, at least 0.1% to 5.0% by weight based on the total weight of the soap bar.

Other nucleoprotein containing material may be used in the present invention, typically including wheat germ and organ tissue such as thymus, spleen, pancreas, liver and testes. The organ tissue may be treated much as described with respect to milt, blood and microbials for purposes of stabilizing and/or concentrating the nucleoprotein material. For example, skin and connective tissue may be removed. The tissue may be finely cut or chopped so that it can be easily and thoroughly dispersed in the soap bar base. The tissue may be washed using alcohols such as methanol, ethanol or isopropanol and may be dried using the previously mentioned techniques.

The following examples serve to illustrate the present invention and are not intended for purposes of limitation.

EXAMPLE I

Fresh, frozen salmon milt (500 grams) was thawed and blended with a Waring blender to yield a homogeneous pasty but flowable material. The blended salmon milt was dispersed in ten volumes of 95% ethanol and brought to boiling. The solids were then filtered to yield 245 grams of ethanol wet product. A 100 gram portion of the wet product was then washed twice with ten volumes of 95% ethanol, filtered, air dried and ground. There was obtained 28.0 grams of a creamy white product. A toilet bar was prepared by adding 0.25 part by weight of the creamy white product to 94.75 parts of soap base flakes [1] and dry blending. The flakes had been finely ground in order to obtain a more uniform distribution of the nucleoprotein material in the soap base. Five parts of water were added and blended. The water aided in fusing the soap particles during pressing of the particles into a soap bar. The pressing was carried out using a Carver Press at a pressure of 2000 p.s.i.g. The bar was tested as hand soap and found to be satisfactory.

EXAMPLE II

Example I was repeated except further including 3 parts of finely ground lauryl isopropyl alkanolamide which was dry blended with the soap base and nucleoprotein material. The bar was tested as hand soap and found to be satisfactory.

EXAMPLE III

Example II was repeated except further including 17 parts sodium dodecyl benzene sulfonate which was dry blended with the soap base, nucleoprotein material and lauryl isopropyl alkanolamide. The bar was tested as hand soap and found to be satisfactory.

EXAMPLE IV

A commercially available soap bar (Ivory) was finely ground and 99.75 parts were dry blended with 0.25 part of the creamy white nucleoprotein material from Example I. The mixture was pressed to form a bar. The bar was tested as hand soap and was found to be superior to the soap bar without the nucleoprotein material.

EXAMPLE V

Microorganisms of the type Sorangium S–495 were obtained from a commercial source. The microorganisms were inoculated in 100 milliliters of culture medium contained in a 500 milliliter Erlenmeyer flask. The culture medium was composed of 2.0% cerelose, 0.5% yeast extract, 0.5% trypton, 0.5% $KH_2PO_4$ and 96.4% water. The medium, prior to inoculation, was adjusted to pH 7.0 and sterilized. Incubation was carried out on a rotary shaker at 25° C. for 42 hours. The shaker rotated in a two inch diameter circle at 250 r.p.m. The cells were then recovered from the medium by centrifugation for 10 minutes at 9,500 r.p.m. The recovered material was a yellow pasty mass having a moisture content of about 80% by weight. The material was dried. The dry cells (0.25 parts by weight) were mixed with water (5.0 parts by weight) and then blended with 94.75 parts of the soap base described in Example I. The mixture was then pressed into the form of a soap bar. The soap bar was used as a hand soap and found to be satisfactory.

The embodiments of the invention in which an exclusive property or privilege is claimed are defined as follows:

1. A toilet bar consisting essentially of nucleoprotein material and at least one member of the group consisting of soap and synthetic anionic detergents, said nucleoprotein material being a member of the group consisting of

---

[1] Produced by Hewitt Soap Co., Dayton, Ohio, and contained 80% saponified tallow and 20% saponified coconut oil by weight.

microorganisms and nucleoprotein obtained from the group consisting of thymus, fish milt and avian blood, said nucleoprotein material being present in said toilet bar in an amount of between about 0.1% and 5.0% by weight.

2. The toilet bar of claim 1 wherein said soap is a member of the group consisting of saponified fats and oils.

3. The toilet bar of claim 2 wherein said soap is saponified tallow.

4. The toilet bar of claim 1 wherein said soap is a mixture including by weight about 80% saponified tallow and about 20% saponified oil selected from the group consisting of saponified coconut oil, castor oil, olive oil, peanut oil, and palm kernel oil.

5. The toilet bar of claim 1 wherein said bar further includes about 5% water by weight.

6. The toilet bar of claim 1 wherein the nucleoprotein material is present in an amount of about 0.25% by weight.

7. The toilet bar of claim 1 wherein the nucleoprotein material is a member selected from the group consisting of fish milt and avian blood.

References Cited

UNITED STATES PATENTS

| 4,400 | 3/1846 | Albert | 252—132 |
|---|---|---|---|
| 41,318 | 1/1864 | Peble | 252—132 |
| 1,882,279 | 10/1932 | Frelinghuysen | 252—132 |
| 3,574,120 | 4/1971 | Siebert | 252—132 |

FOREIGN PATENTS

| 826 | 1854 | Great Britain | 252—132 |
|---|---|---|---|
| 444,165 | 6/1934 | Great Britain | 252—132 |

OTHER REFERENCES

Martin: "The Modern Soap and Detergent Industry, The Technical Press, vol. I and II, 1950–1951, vol. I, chapter VII, p. 51; vol. II, chapter V, pp. 15 and 16, chapter VII, pages 27–32.

LEON D. ROSDOL, Primary Examiner

W. F. SCHULZ, Assistant Examiner

U.S. Cl. X.R.

252—Dig. 16, 132; 424—177